United States Patent [19]
Anderson et al.

[11] Patent Number: 5,327,515
[45] Date of Patent: Jul. 5, 1994

[54] METHOD FOR FORMING A BRAGG GRATING IN AN OPTICAL MEDIUM

[75] Inventors: Dana Z. Anderson, Boulder, Colo.; Turan Erdogan, Berkeley Heights; Victor Mizrahi, Bedminster, both of N.J.

[73] Assignee: AT&T Laboratories, Murray Hill, N.J.

[21] Appl. No.: 4,770

[22] Filed: Jan. 14, 1993

[51] Int. Cl.$^5$ .............................................. G02B 6/10
[52] U.S. Cl. .................................... 385/123; 359/566; 359/570
[58] Field of Search ................ 359/566, 570; 385/123, 385/37

[56] References Cited

U.S. PATENT DOCUMENTS 5,066,133  11/1991  Brienza .............................. 359/570

OTHER PUBLICATIONS

D. M. Tennant et al., "Characterization of near field holography grating masks for optoelectronic fabricated by electron beam lithography," J. Vac. Sci. Technol. B 10(6), Nov. 1992, 2530–2535.

Primary Examiner—Rodney B. Bovernick
Assistant Examiner—Stephen W. Barns
Attorney, Agent, or Firm—M. I. Finston

[57] ABSTRACT

The invention involves a method for making Bragg gratings in glass optical fibers, or other glass optical waveguides, which is relatively insensitive to perturbations in the actinic light used for processing. This method is suitable for mass production and lends itself well to the manufacturing environment. The invention method involves first providing an optical phase grating. An interference pattern is generated by impinging a single light beam on the grating. The optical waveguide to be processed is exposed to this interference pattern, leading to the formation of a Bragg grating in the waveguide.

8 Claims, 3 Drawing Sheets

METHOD FOR FORMING A BRAGG GRATING IN AN OPTICAL MEDIUM

FIELD OF THE INVENTION

This invention relates to methods of processing optical media in order to form gratings within them, and more particularly, to methods for forming Bragg gratings in photosensitive optical fibers.

ART BACKGROUND

Certain prior-art methods for making Bragg gratings in optical fibers involve side-illumination of the fiber by a pair of interfering, actinic light beams. Although they are capable of producing gratings of high quality, these methods are disadvantageous because they are difficult to implement in a manufacturing environment. That is, each of these prior art methods requires interferometric systems having high mechanical stability, and/or demands rigorous control of the spatiotemporal properties of the actinic beams.

SUMMARY OF THE INVENTION

We have discovered a method for making Bragg gratings in glass optical fibers, or other glass optical waveguides, which is relatively insensitive to perturbations in the actinic light used for processing. This method is suitable for mass production and lends itself well to the manufacturing environment.

The inventive method involves first providing an optical phase grating. An interference pattern is generated by impinging a single light beam on the grating. The optical waveguide to be processed is exposed to this interference pattern, leading to the formation of a Bragg grating in the waveguide.

DETAILED DESCRIPTION

An optical phase grating imposes a periodic, or nearly periodic, phase modulation on the incident, actinic beam. An a result, impingement on the grating of a single beam may result in the generation of two or more beams of diffracted radiation. The phase grating of the inventive method, to be referred to as a "phase mask," can be made by any of numerous methods well-known in those arts that relate to diffraction gratings and holography. These methods include both lithographic and holographic techniques.

The period of the phase mask will generally be the same as the period of the desired Bragg grating in the fiber or other waveguide to be processed. (The optical waveguiding medium to be processed will hereafter be referred to as an optical fiber. This is for convenience, and is not intended to limit the scope of the invention.) However, a fiber Bragg grating having a period that is a sub-multiple of the phase-mask period is readily made by exposing the fiber to radiation in non-adjacent diffractive orders of the phase mask. Thus, the mask period may, in fact, be twice the period of the fiber Bragg grating, or some other integer multiple of that period. In at least some cases, the manufacture of phase masks will be simplified if the phase-mask period is greater than the fiber-grating period.

The period of the grating formed in the fiber (or other waveguide) by the inventive method will be largely independent of the wavelength of the actinic radiation (for a given phase mask). As a result, the requirement for temporal coherence of the source of actinic radiation is substantially relaxed relative to prior art methods. Moreover, this independence makes it possible to fully determine the period of a resulting fiber grating by specifying only the mask properties, irrespective of the source of actinic radiation. This relaxes constraints on the spectral stability of the radiation source, and allows flexibility in the selection of the radiation source. In particular, a phase mask that has been created by the interfering beams from a given radiation source can then be used to process an optical fiber by illuminating it with radiation from an entirely different source.

Figure 1:
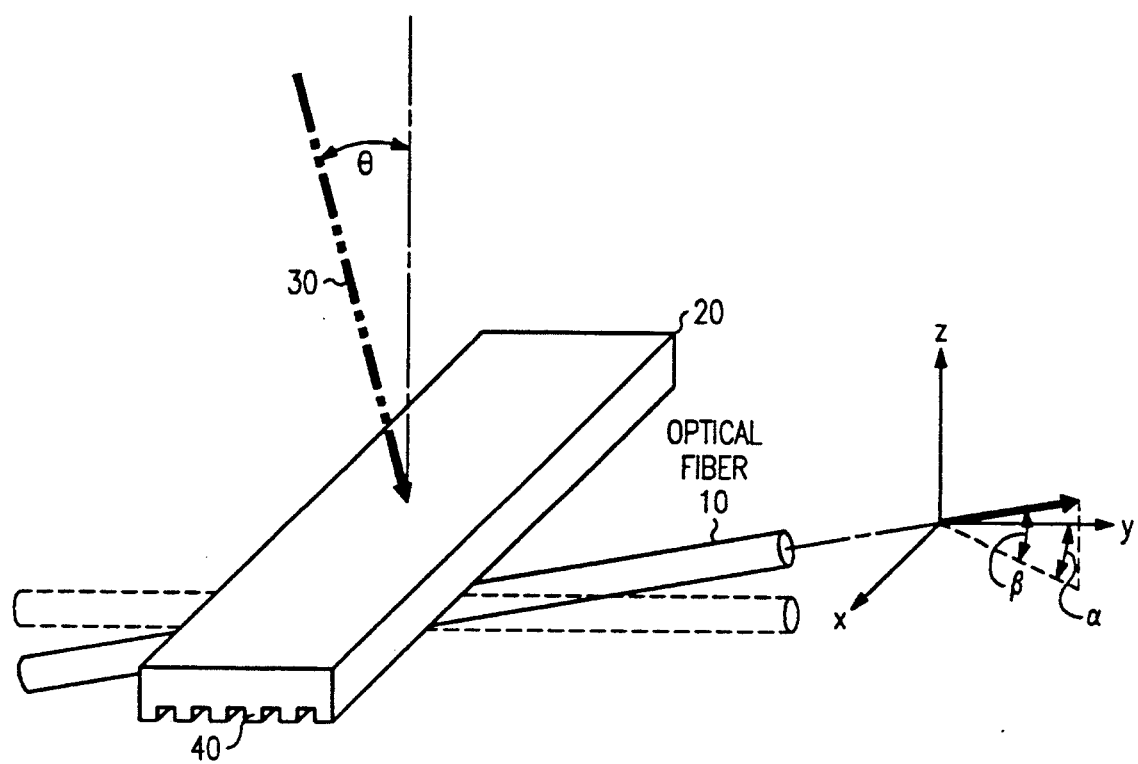
FIG. 1 schematically depicts an illumination geometry for processing an optical fiber according to the invention.

With reference to FIG. 1, fiber 10 (which is to be processed) is situated near phase mask 20. The portion of fiber 10 that is to be processed is preferably situated some distance away from the phase mask, in order to establish, on the fiber, the required interference pattern. A typical separation between the center of the fiber core and the surface of the phase mask is 0.5 mm. (It should be noted that the core of a typical communication optical fiber will generally be situated far enough from the phase mask even when the cladding is touching the phase mask.)

In the figure, the axis perpendicular to the phase mask is denoted the z-axis, the axis parallel to the grating lines of the phase mask is denoted the x-axis, and the axis perpendicular to the x- and z-axes is denoted the y-axis. Light beam 30, which is incident on the phase mask, makes an incidence angle $\theta$ with the z axis. The longitudinal axis of fiber 10 is oriented at a rotational angle $\alpha$ relative to the y-axis, and at a tilt angle $90° - \beta$ relative to the z-axis. According to a currently preferred method, the angles $\alpha$ and $\beta$ are both zero. When the fiber is processed using light from adjacent diffractive orders, the angle $\theta$ will generally not be zero. However, normal incidence ($\theta = 0$) may be appropriate when non-adjacent orders are used.

An appropriate phase mask may be, for example, a transmission surface grating, a reflection surface grating, or even a volume hologram. For example, we have made a transmission phase mask, about 0.5 cm long, by patterning a thin chromium layer deposited on the surface of a fused silica plate. The chromium layer was patterned by electron beam lithography to form an amplitude mask having a period of 520 nm, with lines and spaces approximately equally wide. The silica plate was subjected to reactive ion etching through the amplitude mask, forming corrugations about 250 nm deep, and the patterned chromium layer was then removed.

Figure 2:
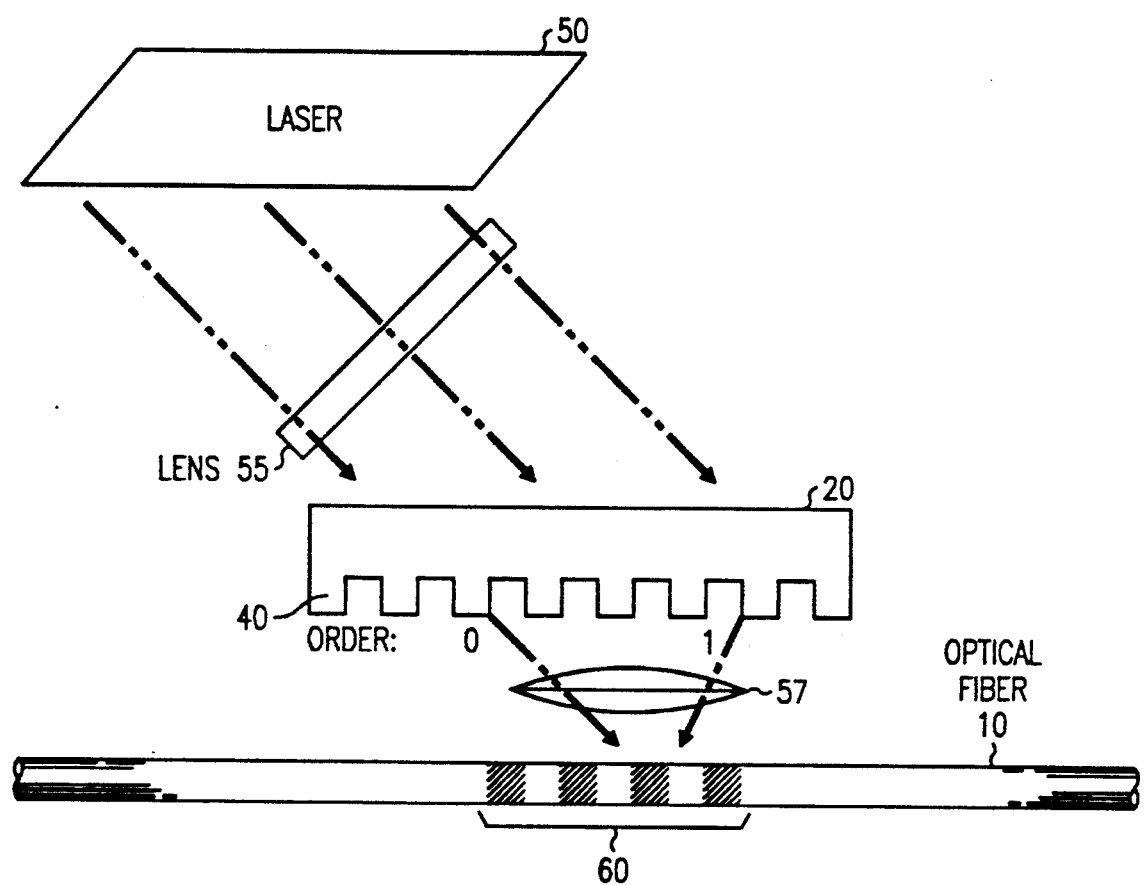
FIG. 2 schematically depicts the illumination geometry of FIG. 1, with further details.

The corrugations are depicted schematically as feature 40 of FIG. 2. The purpose of these corrugations is to vary the phase of incident light in a spatially periodic or nearly periodic manner. Moreover, the energy distribution into the various diffractive orders of the phase mask depends on the design of the corrugations, as is well known in the art of grating-diffraction theory.

The mask was illuminated with light at a wavelength of 242 nm from a pulsed laser source 50. The light in the resulting diffraction pattern was distributed in an approximate 2:1 ratio between the zeroeth-order and first-order diffracted beams, respectively. There was also significant light emitted in other orders. A commercially available AT&T ACCUTETHER ™ optical fiber was aligned parallel to the phase mask and approximately perpendicular to the lines of the phase mask. The distance between the fiber and the phase mask was about 0.5 mm.

The beam was focused onto the fiber by a cylindrical lens 55 having a focal length of 1 m. Lens 55 was situated between source 50 and phase mask 20. It should be noted that by using a suitable magnifying or reducing projection system 57 situated between phase mask 20 and fiber 10, it is possible to form a fiber grating having a period that is different from the period of the phase mask. In fact, by using a zoom system (i.e., a projective optical system having variable reduction and/or variable magnification), it is possible to continuously vary the period of the resulting fiber grating. This is advantageous, for example, when it is simpler to manufacture phase masks having a larger period than the resulting gratings.

The fiber received an energy dose of about 1.7 mJ per pulse at 30 pulses per second. The total exposure time was about 20 minutes.

Figure 3:
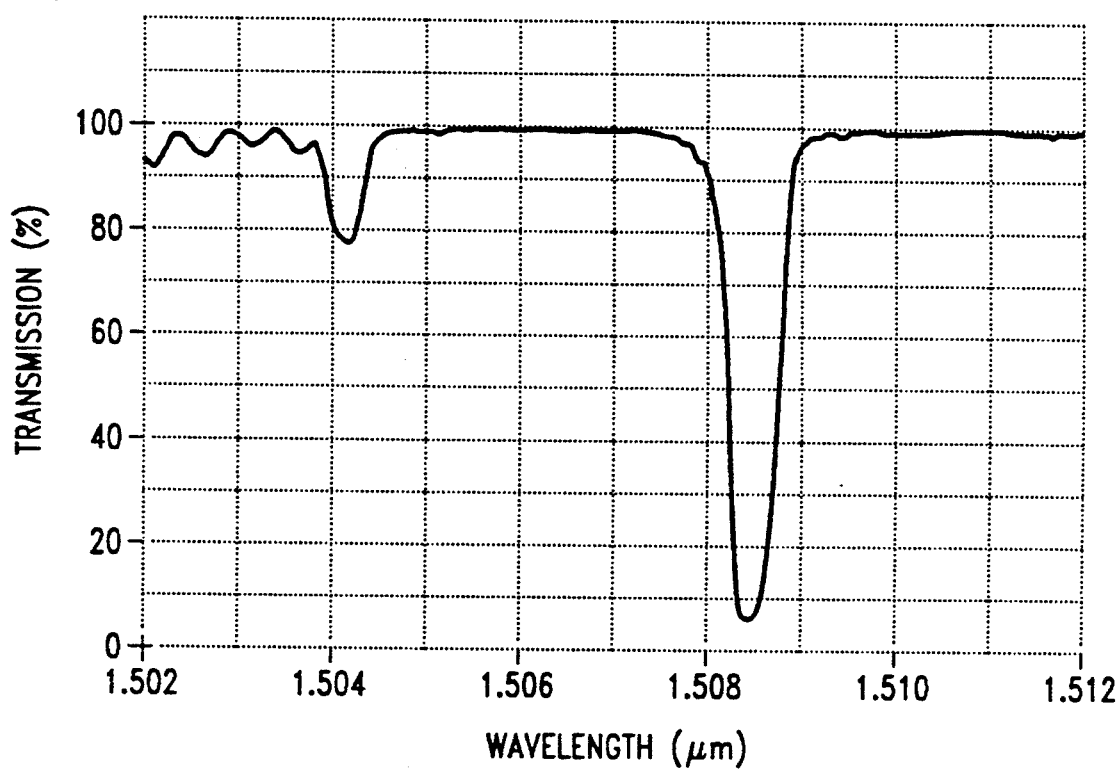
FIG. 3 is the transmission spectrum of a fiber grating made according to the invention, in one embodiment.

The transmission spectrum of the resulting grating 60 is shown in FIG. 3. As is evident in the figure, the grating had a main reflectivity peak centered at 1508.4 nm with a FWHM of 0.54 nm. Significantly, the peak reflectivity was greater than 90%. Such high reflectivities are important for making fiber lasers. Clearly, peak reflectivities of 40% and more are readily attainable by this technique.

We believe that the inventive technique is readily applied not only to glass optical fibers, but also to other waveguiding geometries of photosensitive glass. These include, for example, planar waveguides and channel waveguides. We intend the scope of the invention to include alternative waveguiding geometries such as these.

The inventive method is readily applied to produce multiple fiber gratings from a single phase mask. In one aspect, this is achieved by the sequential processing of a group of optical fibers. In a second aspect, this is achieved by the simultaneous processing of a group of optical fibers by exposing them to the interference pattern generated by a single phase mask.

In yet a third aspect, the multiple gratings are made in spatially separated regions of a single optical fiber. One way to achieve this is to provide a single phase mask that includes two or more spatially separated phase gratings, each corresponding to one of the respective fiber regions. These phase gratings may be illuminated either simultaneously or sequentially. Sequential illumination may be, e.g., by a continuous scan, or by separate exposure steps. Illumination may be by a single actinic beam, by multiple actinic beams that have been split from a single source, or by actinic beams from multiple sources.

A second way to achieve this is to provide a single phase mask that includes one phase grating long enough to generate appropriate interference patterns in all of the respective fiber regions. Each of the respective fiber regions then corresponds to a particular section of the long phase grating. These corresponding sections are, e.g., illuminated sequentially. If the long phase grating has a spatially varying period, it is readily used to form a group of two or more fiber gratings having different periods. Such a grating is also readily used to make a chirped fiber grating; i.e., a grating having a spatially varying period. For this purpose, illumination in a continuous scan of the phase mask will often be desirable.

Formation of two or more spatially separated gratings in a single fiber is useful, e.g., for making optical cavities in fibers. If a suitable gain medium, such as a rare-earth-doped core, is included in the optical cavity, a fiber laser (or other waveguide laser, for a waveguide that is not an optical fiber) can be made in this fashion.

The inventive method offers control over several significant aspects of the fiber grating that is to be formed. For example, the amplitude of the refractive-index modulations in the fiber grating can itself be spatially modulated. With reference to FIG. 1, this is achieved, e.g., by an exposure step during which phase mask 20 is scanned, in the direction parallel to fiber 10, by actinic beam 30. During the scan, the intensity of beam 30 is varied in a predetermined manner.

Moreover, the fiber grating can be blazed; that is, the phase fronts of actinic radiation within the fiber can be tilted in such a way that the resulting grating will couple light into or out of the fiber with enhanced efficiency. Blazing is achieved by rotating the phase mask relative to the fiber through an appropriate angle $\alpha$, as shown in FIG. 1.

Furthermore, the profile of the phase mask can be generated by computer, and implemented, under computer control, by a method such as electron-beam lithography. This makes it possible to achieve numerous special effects. For example, an appropriate phase mask having curved lines can be used to form a fiber grating that is capable of focusing light that is coupled into or out of the fiber.

The properties of the fiber grating are also affected by varying the angles $\theta$ and $\beta$. (See FIG. 1.) By varying $\theta$, some control is exerted over the diffraction efficiency into the various orders of the phase mask. Variations of $\theta$ also affect the tilt angle of the grating formed within the optical fiber.

Varying $\beta$ does not affect the diffraction efficiencies, but it offers some control over the period of the fiber grating. That is because the projection of the fiber grating onto the phase mask must have a period that is independent of $\beta$. Thus, a small change of $\beta$ from zero will increase the period of the fiber grating by a factor of sec $\beta$. Changing $\beta$ will also change the blaze of the fiber grating.

As noted, the relative amounts of light diffracted into the various orders of the phase mask can be changed somewhat by changing the incidence angle $\theta$. As is well-known in the relevant arts, the relative efficiencies of the diffractive orders can also be controlled by appropriate design of the phase mask. For example, normal incidence on a phase mask having a square grating profile of the appropriate amplitude will result in suppression of all even orders, with equal intensities refracted into the +1 and −1 orders.

In the preceding discussion, it has been assumed that the phase mask is a phase grating; i.e., an optical element that imposes a periodic, or nearly periodic, phase modulation on the incident, actinic beam. However, it should be noted that in some cases it may be useful to provide an optical element that imposes, instead, a non-periodic phase modulation. Such a phase modulation will generate a complex wavefront when the optical element is illuminated with a single beam of actinic radiation. This complex wavefront may be useful for producing optical elements that include refractive index modulations more complex than Bragg gratings.

We claim:

1. A method for forming a grating in an optical waveguide comprising a glass that is sensitive to at least some wavelengths of electromagnetic radiation, to be referred to as "actinic radiation," the method comprising the steps of:
   a) providing an optical phase grating having an average period to be denoted $P_1$;
   b) impinging a single beam of actinic radiation on the phase grating such that actinic radiation is diffracted into at least two diffractive orders of the phase grating, resulting in an interference pattern; and
   c) exposing at least a first waveguide to the interference pattern such that a grating pattern of refractive index modulations is formed in the waveguide, the waveguide grating pattern having an average period to be denoted $P_2$; wherein
   d) during the exposing step, the waveguide is exposed to actinic radiation from two non-adjacent, diffractive orders, resulting in a value for $P_1$ that is approximately $n \times P_2$, wherein n is an integer greater than 1.

2. The method of claim 1, wherein $n = 2$.

3. A method for forming a grating in an optical waveguide comprising a glass that is sensitive to at least some wavelengths of electromagnetic radiation, to be referred to as "actinic radiation," the method comprising the steps of:
   a) providing an optical phase grating;
   b) impinging a single beam of actinic radiation on the phase grating such that actinic radiation is diffracted into at least two diffractive orders of the phase grating, resulting in an interference pattern; and
   c) exposing at least a first waveguide to the interference pattern such that a grating pattern of refractive index modulations is formed in the waveguide, wherein the impinging step comprises:
   d) scanning the actinic beam along the phase grating, and during the scanning step, varying the intensity of the actinic beam.

4. A method for forming a grating in an optical waveguide comprising a glass that is sensitive to at least some wavelengths of electromagnetic radiation, to be referred to as "actinic radiation," the method comprising the steps of:
   a) providing an optical phase grating;
   b) impinging a single beam of actinic radiation on the phase grating such that actinic radiation is diffracted into at least two diffractive orders of the phase grating, resulting in an interference pattern; and
   c) exposing at least a first waveguide to the interference pattern such that a grating pattern of refractive index modulations is formed in the waveguide, wherein:
   d) the phase grating has a spatially varying period, and the impinging step is conducted such that the resulting waveguide grating pattern has a spatially varying period.

5. A method for forming a grating in an optical waveguide comprising a glass that is sensitive to at least some wavelengths of electromagnetic radiation, to be referred to as "actinic radiation," the method comprising the steps of:
   a) providing an optical phase grating;
   b) impinging a single beam of actinic radiation on the phase grating such that actinic radiation is diffracted into at least two diffractive orders of the phase grating, resulting in an interference pattern; and
   c) exposing at least a first waveguide to the interference pattern such that a grating pattern of refractive index modulations is formed in the waveguide, wherein
   d) a peak reflectivity is associated with the waveguide grating pattern with respect to at least one peak wavelength, and the exposing step is carried out such that the resulting peak reflectivity is at least 40%.

6. The method of claim 5, wherein the exposing step is carried out such that the resulting peak reflectivity is at least 90%.

7. A method for processing an optical waveguide that comprises a glass that is sensitive to at least some wavelengths of electromagnetic radiation, to be referred to as "actinic radiation," the method comprising forming a grating in the waveguide and forming at least a second grating in the waveguide, wherein each respective grating-forming step comprises:
   a) providing an optical phase grating;
   b) impinging a single beam of actinic radiation on the phase grating such that actinic radiation is diffracted into at least two diffractive orders of the phase grating, resulting in an interference pattern; and
   c) exposing the waveguide to the interference pattern such that a grating pattern of refractive index modulations is formed in the waveguide, wherein:
   d) the exposing steps are carried out such that the respective first and second gratings are formed in spatially separated portions of the waveguide, and such that an optical cavity is defined within the waveguide between the first and second gratings.

8. The method of claim 7, wherein the waveguide further comprises a laser gain medium, the exposing steps are carried out such that at least a portion of the gain medium is included within the optical cavity, and the exposing steps are further carried out such that appropriate stimulation will cause the resulting optical cavity to function as a laser.

* * * * *

Adverse Decision in Interference

Patent No. 5,327,515, Dana Z. Anderson, Turan Erdogan, Victor Mizrahi, METHOD FOR FORMING A BRAGG GRATING IN AN OPTICAL MEDIUM, Interference No. 104,331, final judgment adverse to the patentees rendered August 7, 2002 as to claims 1, 2 and 5-8.

(*Official Gazette, October 1, 2002*)